US009545770B2

(12) United States Patent
Miller

(10) Patent No.: US 9,545,770 B2
(45) Date of Patent: Jan. 17, 2017

(54) DIS-BOND MEMBRANE FOR A LINED PRESSURE VESSEL

(71) Applicant: The Boeing Company, Chicago, IL (US)

(72) Inventor: Richard A. Miller, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 128 days.

(21) Appl. No.: 14/255,047

(22) Filed: Apr. 17, 2014

(65) Prior Publication Data
US 2015/0298857 A1 Oct. 22, 2015

(51) Int. Cl.
B32B 1/02 (2006.01)
B32B 27/20 (2006.01)
B32B 27/08 (2006.01)
B32B 27/38 (2006.01)
B32B 27/36 (2006.01)
B32B 27/32 (2006.01)
B32B 7/12 (2006.01)
B32B 3/02 (2006.01)
B32B 27/28 (2006.01)

(52) U.S. Cl.
CPC . B32B 3/02 (2013.01); B32B 1/02 (2013.01); B32B 7/12 (2013.01); B32B 27/08 (2013.01); B32B 27/20 (2013.01); B32B 27/288 (2013.01); B32B 27/32 (2013.01); B32B 27/36 (2013.01); B32B 27/38 (2013.01); B32B 2262/106 (2013.01); B32B 2307/7242 (2013.01); B32B 2439/40 (2013.01); Y10T 428/24744 (2015.01); Y10T 428/24752 (2015.01)

(58) Field of Classification Search
CPC .............. B32B 3/02; B32B 1/02; B32B 27/32; B32B 27/20; B32B 27/288; B32B 27/08; B32B 27/36; B32B 27/38; B32B 2262/106; B32B 2307/7242; B32B 2439/40; Y10T 428/24752; Y10T 428/24744; Y10T 29/49826; Y10T 29/49849
USPC ............................ 220/567.2, 560.08; 29/428
See application file for complete search history.

(56) References Cited

U.S. PATENT DOCUMENTS

| 3,508,677 A * | 4/1970 | Laibson | B29C 65/00 220/590 |
| 3,728,206 A * | 4/1973 | Buese | A61F 13/04 206/389 |
| 3,937,781 A * | 2/1976 | Allen | B29C 70/342 264/258 |
| 4,149,649 A * | 4/1979 | Szego | B65D 90/40 169/66 |
| 4,988,011 A | 1/1991 | Fenton et al. | |
| 5,499,739 A | 3/1996 | Greist, III et al. | |
| 6,276,401 B1 * | 8/2001 | Wilson | F16L 58/1063 138/172 |
| 6,387,524 B1 * | 5/2002 | Finefrock | B32B 15/06 220/62.11 |

(Continued)

FOREIGN PATENT DOCUMENTS

GB 2385297 A * 8/2003 .............. B32B 7/02
WO 2011030019 A1 3/2011

Primary Examiner — Christopher Besler
Assistant Examiner — Bayan Salone
(74) Attorney, Agent, or Firm — Yee & Associates, P.C.

(57) ABSTRACT

A dis-bond membrane prevents co-mingling between a thermoplastic liner and a fiber reinforced thermoset outer wall of a pressure vessel during thermal curing of the outer wall.

19 Claims, 8 Drawing Sheets

(56) References Cited

U.S. PATENT DOCUMENTS

| | | |
|---|---|---|
| 6,444,071 B1 | 9/2002 | Ayorinde |
| 6,787,007 B2 | 9/2004 | Lessing |
| 7,086,553 B2 | 8/2006 | Debecker et al. |
| 7,326,281 B2 * | 2/2008 | Fujita .................... F17C 11/005 206/0.7 |
| 7,536,786 B2 | 5/2009 | Toh et al. |
| 7,810,670 B2 * | 10/2010 | Carter ...................... F17C 1/06 220/565 |
| 7,837,054 B2 | 11/2010 | Van Oyen et al. |
| 7,870,971 B2 * | 1/2011 | Schlag ................... B29C 41/04 220/585 |
| 7,918,956 B2 | 4/2011 | Mehta et al. |
| 8,038,029 B2 | 10/2011 | Lindner et al. |
| 8,051,977 B2 * | 11/2011 | Fujita .................... F17C 11/005 165/157 |
| 8,517,206 B2 | 8/2013 | Liu |
| 8,906,287 B2 * | 12/2014 | Hatta ....................... F17C 1/16 264/154 |
| 2002/0088806 A1 | 7/2002 | Takaku et al. |
| 2002/0117123 A1 | 8/2002 | Hussain et al. |
| 2006/0188706 A1 * | 8/2006 | Kobayashi ................ B32B 7/12 428/317.1 |
| 2009/0208688 A1 * | 8/2009 | Nakayama ................ B32B 3/02 428/41.8 |
| 2010/0072209 A1 | 3/2010 | Hatta |
| 2010/0181213 A1 | 7/2010 | Fujita et al. |
| 2010/0192349 A1 * | 8/2010 | Vishnick .................... B60J 1/20 29/426.5 |
| 2012/0076677 A1 | 3/2012 | Caughley |
| 2013/0082066 A1 * | 4/2013 | Prakash ................. B65D 13/00 220/646 |

* cited by examiner

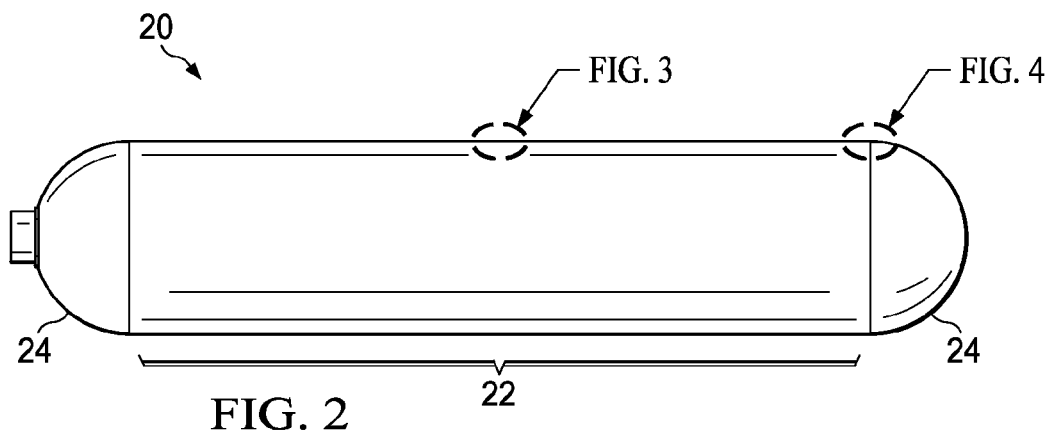
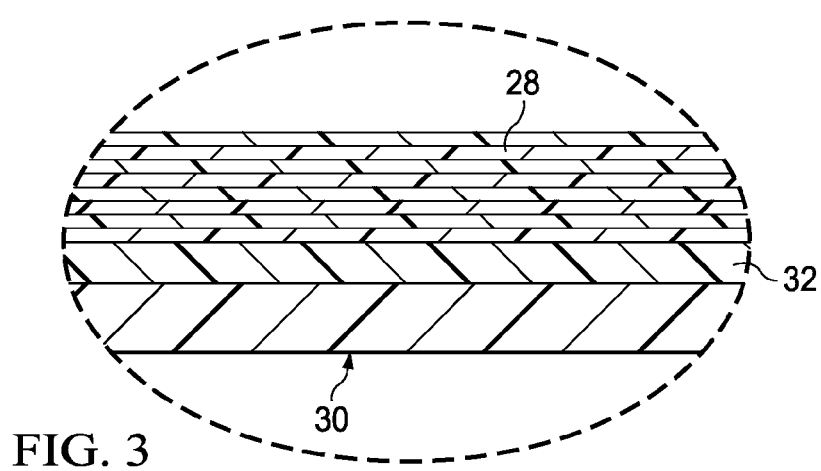
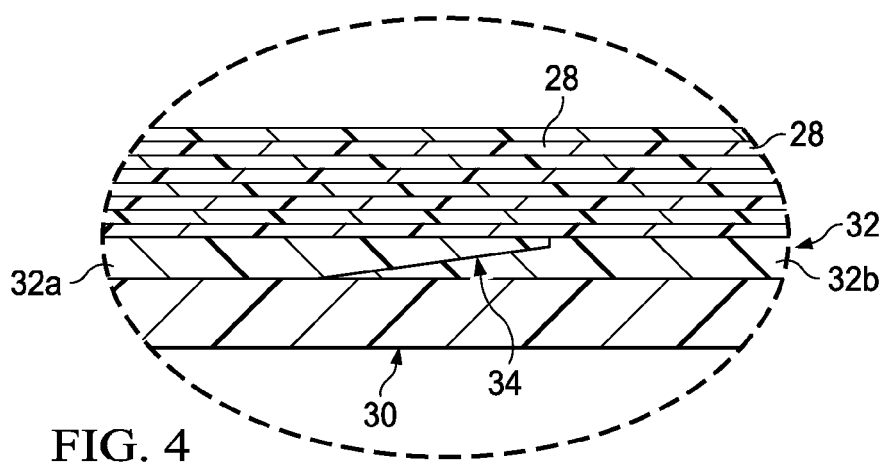

DIS-BOND MEMBRANE FOR A LINED PRESSURE VESSEL

BACKGROUND INFORMATION

1. Field

The present disclosure generally relates to composite pressure vessels having liners, and deals more particularly with a dis-bond membrane that prevents bonding between the composite pressure vessel and the liner.

2. Background

Several types of constructions are known for high pressure vessels used to store liquids or gases such as hydrogen, for example. In one type of construction, commonly referred to as a Type IV pressure vessel, a plastic inner liner is surrounded by an outer structural wall formed by a fiber reinforced resin wrap. These types of pressure vessels are typically cylindrical in shape with domed ends. The pressurize vessels are cyclically pressurized, both as part of the fabrication process, and later, when placed in service.

The mechanical performance of the pressure vessel may depend upon the compatibility of the materials used for the liner and structural outer wall, and the processes used to fabricate the vessel. For example, where the liner is formed of a thermoplastic and the structural outer wall is formed of a thermoset that is in contact with the thermoplastic, undesired stress concentrations in the vessel may result from co-mingling of the thermoplastic with the reinforcing fibers used in the wall. This co-mingling occurs when the temperature at which the thermoplastic softens and/or melts is below the cure temperature of the thermoset resin used in the wall. During curing of the thermoset resin outer wall, the thermoplastic liner softens to the point that it flows or migrates into the wall. When the thermoset wall cools following curing, the migrated thermoplastic may cover and surround some of the reinforcing fibers of the wall, causing random bonds to be formed between the liner and the outer wall. These random bonds create undesired stress points when the liner expands and contracts during use. The presence of these stress points between the liner and the outer wall may reduce the performance of the pressure vessel.

Accordingly, there is a need for a method of fabricating a pressure vessel that reduces or eliminates bonding between an inner thermoplastic liner and a thermoset outer wall. There is also a need for a dis-bond barrier, and a simple method for installing the barrier between the liner and the outer wall.

SUMMARY

The disclosed embodiments provide a method of fabricating a pressure vessel having a dis-bond membrane between an inner liner and an outer structural wall. The dis-bond membrane prevents bonding between the inner liner and the structural outer wall. In embodiments where the outer wall is formed of a thermoset and the inner liner is made of a thermoplastic, the dis-bond membrane prevents co-mingling of the thermoplastic liner and reinforcing fibers in the outer wall during curing of the thermoset. The reduction or elimination of bonding between the inner liner and the outer wall may improve the performance of the pressure vessel, as well as its reliability and service life.

According to one disclosed embodiment, a method is provided for use in fabricating a pressure vessel in which a dis-bond membrane is formed between a structural outer wall and an inner liner having a cylindrical section and dome ends. The method comprises installing a cylinder section of a barrier film around the cylindrical section of the liner, and installing dome sections of the barrier film over the domed ends of the liner, including stretching the dome sections of the barrier film to conform to the dome ends and overlap a portion of the cylinder section of the barrier film. Installing the cylinder section of the barrier film is performed by attaching the cylinder section of the barrier film to the cylindrical section of the liner. Attaching the cylinder section of the barrier film is performed using an adhesive tape. The dome sections of the barrier film may be installed by applying an adhesive along outer edges of the cylinder section of the barrier film, and adhering the dome sections of the barrier film to the adhesive. Applying the adhesive along the outer edges of the cylinder section of the barrier film is performed by applying an adhesive tape to the outer edges of the barrier film, and adhering the dome sections of the barrier film to the adhesive includes tacking outer edges of the dome sections of the barrier film to the adhesive tape. Installing the dome sections of the barrier film includes removing a part of the outer edges of the cylinder section of the barrier film extending beyond the adhesive.

According to another embodiment, a method is provided of fabricating a pressure vessel having a constant cylindrical body and dome-shaped outer ends. A thermoplastic liner having a cylindrical section and dome ends is fabricated, and a cylinder section of a barrier film is installed on the thermoplastic liner. Dome sections of the barrier film are stretched respectively over the dome ends of the thermoplastic liner. The dome sections of the barrier film are attached to the cylinder section of the barrier film, and a composite structural outer wall is fabricated over the thermoplastic liner. Stretching the dome sections of the barrier film includes drawing the dome sections of the barrier film into overlapping relationship to the cylinder section of the barrier film. Attaching the dome sections of the barrier film to the cylinder section of the barrier film may be performed by applying double-sided adhesive tape on edges of the cylinder section of the barrier film, and adhering edges of the dome sections of the barrier film to the double-sided adhesive tape. The method may further comprise trimming away an edge of the cylinder section of the barrier film extending beyond the double-sided adhesive tape. Attaching the dome sections of the barrier film to the cylinder section of the barrier film includes applying Mylar® film along outer edges of the cylinder section of the barrier film, and applying the double-sided adhesive tape is performed by applying the double-sided adhesive tape on the Mylar® film. The structural outer wall may include a thermoset resin having a cure temperature. The thermoplastic liner has a softening temperature that is less than the cure temperature of the structural outer wall, and the barrier film is a thermoplastic having a softening temperature that is greater than the cure temperature of the structural outer wall. The method may also include curing the structural outer wall, and using the barrier film to prevent bonding of the barrier film and the structural outer wall. Fabricating the structural outer wall may be performed by fabricating composite dome caps, installing the composite dome caps respectively on the dome ends of the thermoplastic liner, and wrapping composite material around the cylindrical section of the thermoplastic liner.

According to still another disclosed embodiment, a dis-bond membrane is provided between thermoplastic liner having cylindrical section and dome ends, and a fiber reinforced thermoset outer wall surrounding the liner. The dis-bond membrane comprises a barrier film between the outer wall and the liner. The barrier film includes a cylinder section, and dome sections respectively attached to and overlapping opposite ends of the cylinder section. The liner has a softening temperature that is less than a cure temperature of the thermoset, and the barrier film is a thermoplastic having a softening temperature greater than the cure temperature of the thermoset. The liner may be formed from polyethylene, and the barrier film may be formed from fluorinated ethylene propylene. In one application, the softening temperature of the liner is approximately between 250° F. and 275° F., and the cure temperature of the thermoset is approximately between 250° F. and 300° F. Each of the dome sections of the barrier film is stretched over the dome ends of the liner, and the dome sections of the barrier film have edges adhesively attached to the cylinder section of the barrier film. The barrier film may be one of polyester, and polyether ether ketone.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 2 is an illustration of a side elevational view of the pressure vessel shown in FIG. 1.

FIG. 3 is an illustration of the area designated as FIG. 3 in FIG. 2.

FIG. 4 is an illustration of the area designated as FIG. 4 in FIG. 2.

DETAILED DESCRIPTION

Figure 1:
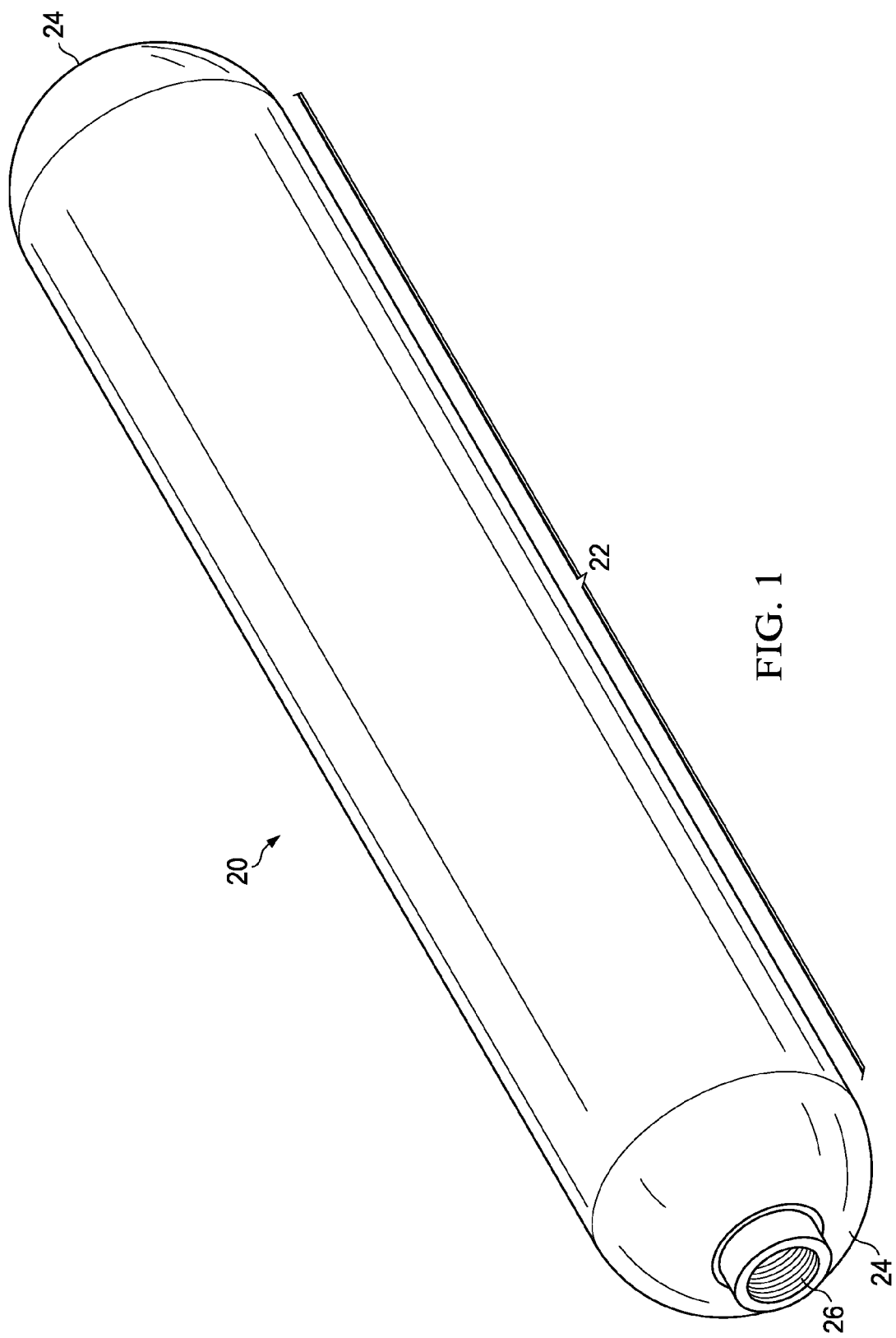
FIG. 1 is an illustration of a perspective view of a pressure vessel having a dis-bond barrier between an inner liner and an outer wall.

Referring first to FIG. 1, a pressure vessel 20 comprises a substantially constant cylindrical body 22 and dome-shaped outer ends 24. One or both of the dome-shaped ends 24 may have a boss 26 adapted to receive a suitable fitting (not shown) that may be used to either fill the pressure vessel 20 with a gas or draw gas from the pressure vessel 20.

Referring now also to FIGS. 2, 3, 4, 5 and 6 the pressure vessel 20 broadly comprises an inner liner 30 surrounded by a composite structural outer wall 28. In one embodiment, the structural outer wall 28 may comprise a constant cylinder section 44 (FIG. 5), and separate dome caps 42 that are overlapped (see FIG. 6) at 34 by the constant cylinder section 44. The constant cylinder section 44 and the dome caps 42 are formed of a thermosetting prepreg tape or tows. In other embodiments however, the structural outer wall 28 may comprise a single composite structure formed by wrapping prepreg tape or tows around the entire outer surface of the liner 30.

Figure 5:
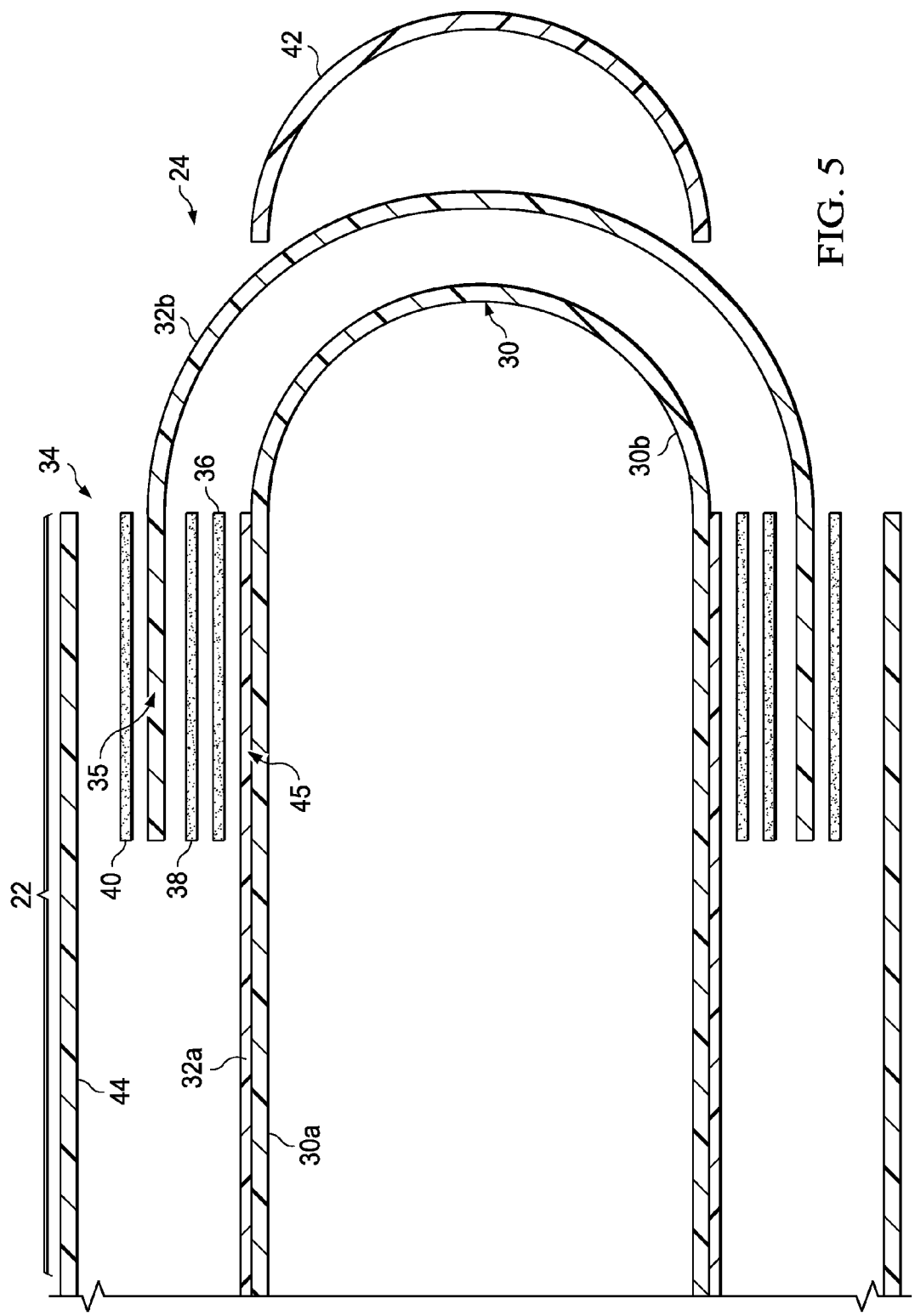
FIG. 5 is illustration of an exploded, cross sectional view of one and of the pressure vessel shown in FIGS. 1-4.
Figure 6:
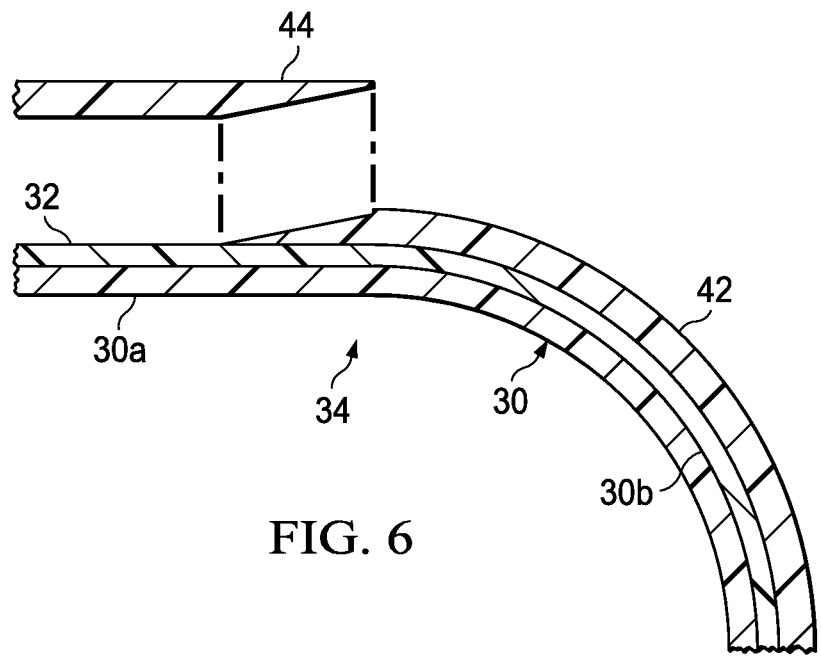
FIG. 6 is an illustration of a partially exploded, cross sectional view of a portion of the pressure vessel, showing the overlapping relationship between two sections of the structural outer wall.

As is shown in FIG. 5, the inner liner 30 is a unitary structure having a cylindrical section 30a and a pair of dome ends 30b. The inner liner 30 is isolated from the structural outer wall 28 by a dis-bond membrane 32, sometimes also referred to herein as a barrier film 32. The structural outer wall 28 is formed of a composite that may comprise a fiber reinforced thermoset resin, using any of a number of techniques, such as automated placement of prepreg tape or tows. In one embodiment, the structural outer wall 28 may be formed of carbon fiber epoxy prepreg, however other embodiments may use other fiber reinforced thermoset resins.

The liner 30 may comprise, without limitation a suitable thermoplastic resin which may or may not have a fiber reinforced incorporated therein. In one embodiment for example, the liner 30 may comprise polyethylene. The thermoplastic material from which the inner liner 30 is formed typically begins to soften and/or melt at a temperature that is less than the temperature required to thermally cure the structural outer wall 28. For example, and without limitation, the thermoset resin from which the structural outer wall 28 is formed may be cured at a temperature of between approximately 250° F. and 300° F., while the thermoplastic inner liner 30 has a softening temperature at which the thermoplastic may begin to soften and flow at a temperature of between approximately 250° F. and 275° F.

The dis-bond membrane 32 comprises a constant cylinder section 32a and a pair of dome sections 32b which respectively overlap and are attached to outer edges of the constant cylinder section 32a. The dis-bond membrane 32 may comprise a polymer material that does not substantially soften or flow below the cure temperature of the thermoset resin in the structural outer wall 28. For example, where the thermoset resin is an epoxy having a cure temperature of between 250° F. and 300° F., the dis-bond membrane 32 may comprise a barrier film 32 of thermoplastic such as FEP (fluorinated ethylene propylene) which does not substantially soften or begin flow until it is heated to a temperature of at least approximately between 350° F. and 450°. Depending upon the cure temperature of the particular thermoset resin used in the structural outer wall 28, the dis-bond membrane 32 may be formed of other film materials such as, without limitation, Mylar® film (stretched polyester film) or PEEK (polyether ether ketone). A barrier film 32 should be selected that has sufficient lubricity to allow it to slip relative to the liner 30 as the liner 30 expands and contracts during as it is cyclically pressurize. The barrier film 32 should also be sufficiently stretchable for the application. For example, in one embodiment, the barrier film may have an elongation of approximately 200%. As will be discussed below in more detail, the dis-bond membrane 32 is applied by stretching it over the dome ends 30b of the inner liner 30, and into overlapping relationship to the cylindrical section 30a of the inner liner 30.

Referring particularly to FIG. 5, the outer edges 35 of the dome sections 32b of the barrier film 32 overlap (at 34) the outer edges 45 of the constant cylinder section 32a of the barrier film 32. The outer edges 35, 45 are attached to each other by a layer of double-sided, adhesive tape 38 and a strip of suitable adhesive film 36 such as, without limitation, Mylar®. A strip of a suitable adhesive film 40 also overlies the edges 35 of the dome section 32b of the barrier film 32, beneath the constant cylinder section 44 of the structural outer wall 28. It may thus be appreciated that the constant cylinder section 32a and the dome sections 32b, together with the overlap 34 between these two sections, form a continuous dis-bond membrane 32 between the inner liner 30 and the structural outer wall 28. As will be discussed later below, each of the constant cylinder sections 32a and the dome sections 32b of the dis-bond membrane 32 are substantially wrinkle-free because they are tightly stretched over the liner 30. Because no portion of the barrier film 32 is directly attached to the liner 30, the liner 30 is free to slip inside the barrier film 32 as the pressure vessel 20 expands and contracts during its normal pressure cycles.

Figure 7:
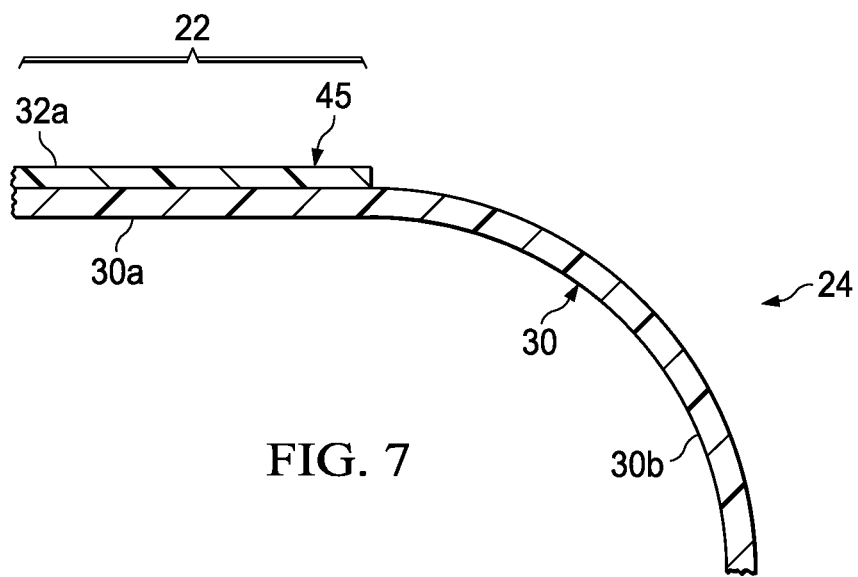
FIGS. 7-12 are illustrations of cross-sectional views showing the pressure vessel in sequential states of fabrication.
Figure 8:
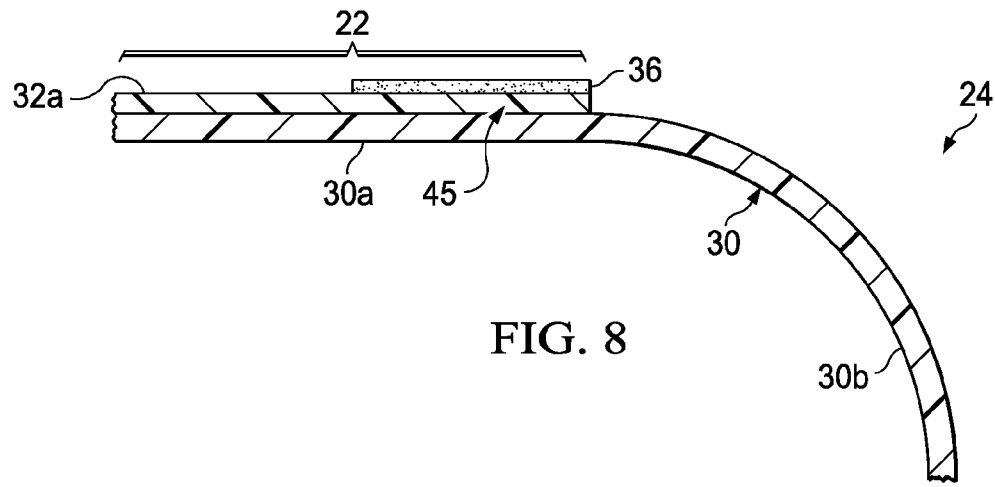

Attention is now directed to FIGS. 7-12 which illustrate the sequential steps of a method of forming a dis-bond membrane 32 between the inner liner 30 and the structural outer wall 28. As shown in FIGS. 7 and 8, the constant cylinder section 32a of the dis-bond membrane 32 is formed by tightly wrapping a sheet of thermoplastic material around the constant cylinder section 30a of the liner 30, and securing one end thereof in place using a suitable adhesive tape 36 such as Mylar®, applied to the outer edges 45 at one end of the cylindrical section 30a of the liner 30. To eliminate possible wrinkling, the thermoplastic sheet is held in tension and stretched slightly as it is drawn around the circumference of the constant cylinder section 30a of the liner 30.

Figure 9:
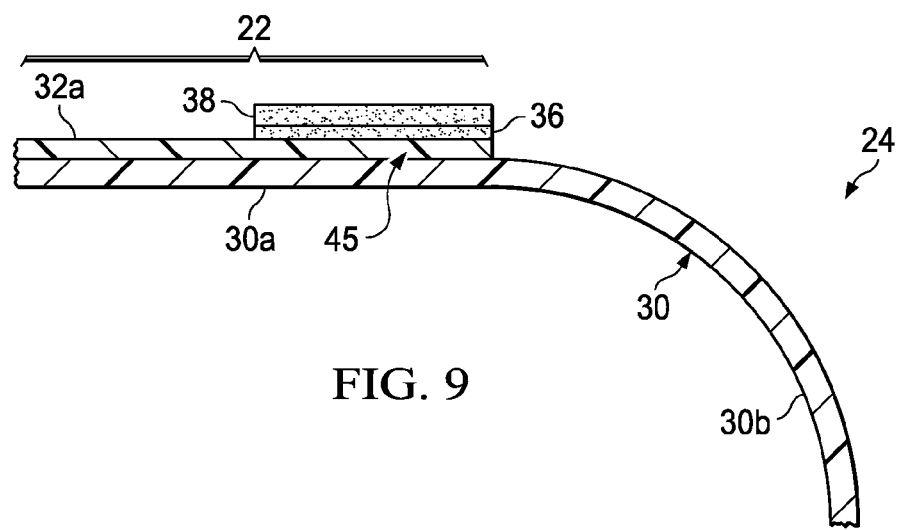
Figure 10:
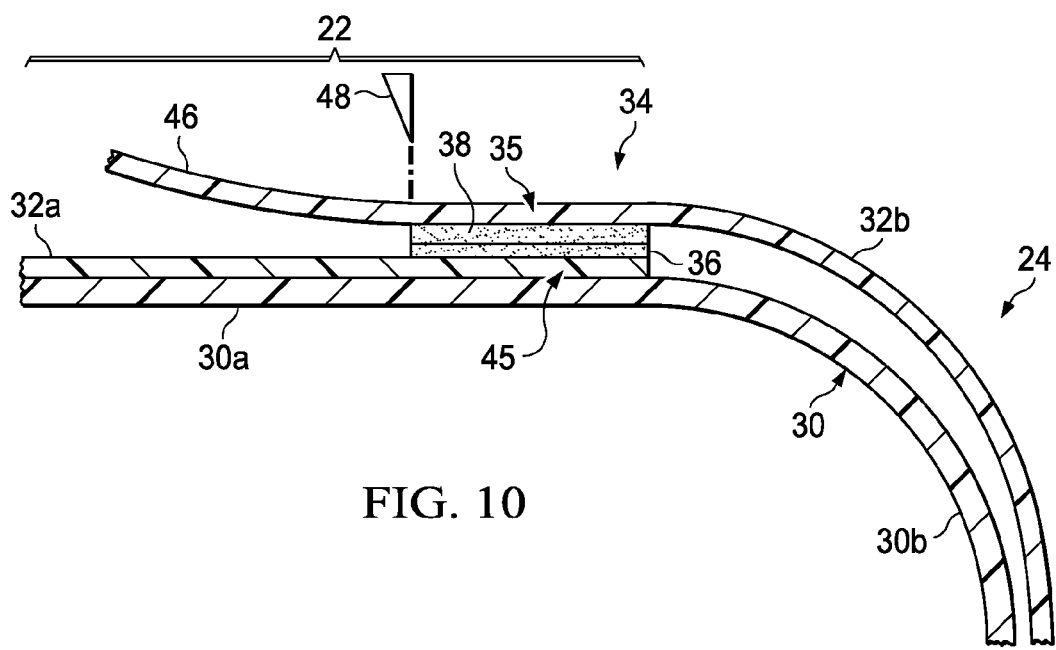
Figure 11:
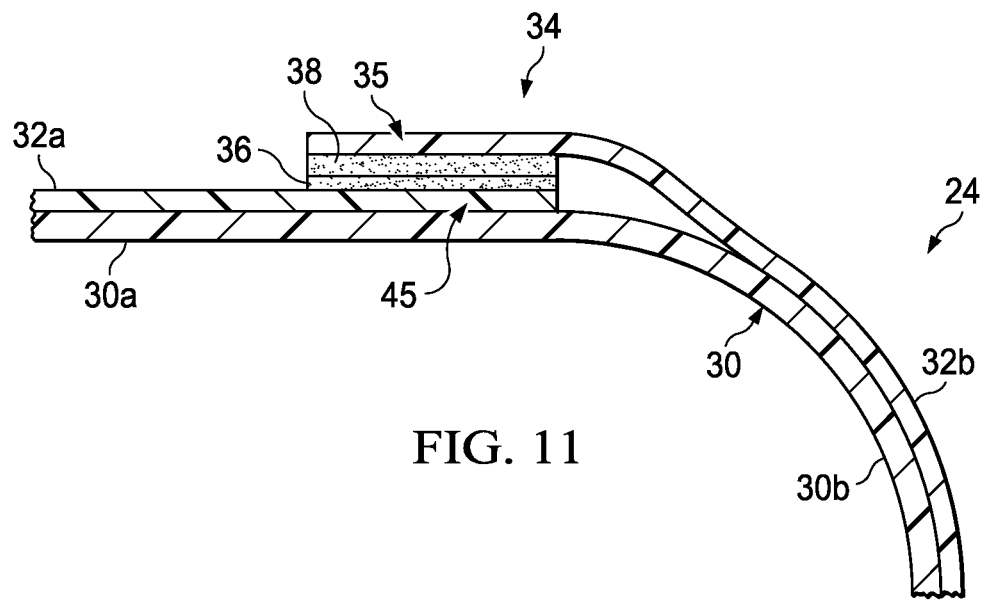

Next, as shown in FIG. 9, on the end of the liner 30 opposite the end that has been attached to the liner using the adhesive tape 36, a strip of double-sided adhesive tape 38 is attached to the strip of adhesive tape 36 around the entire circumference of the constant cylinder section 32a. The double sided adhesive tape 38 does not contact the liner 30. Then, as shown in FIG. 10, a sheet of stretchable thermoplastic material is tightly stretched over one dome end 30b of the liner 30, and is pulled down over the outer edges 45 of the cylindrical section 30a of the liner 30, thereby forming a dome section 32b of the dis-bond membrane 32. The outer edges 35 of the dome section 32b are adhered to the double-sided tape 38, and any excess film 46 that extends beyond the overlap 34 is trimmed away using a suitable cutter 48, leaving a dome section 32b that is wrinkle-free and tightly stretched (see FIG. 11) over the dome end 30b of the liner 30, and which both overlaps and is attached to the constant cylinder section 32a of the dis-bond membrane 32.

Figure 12:
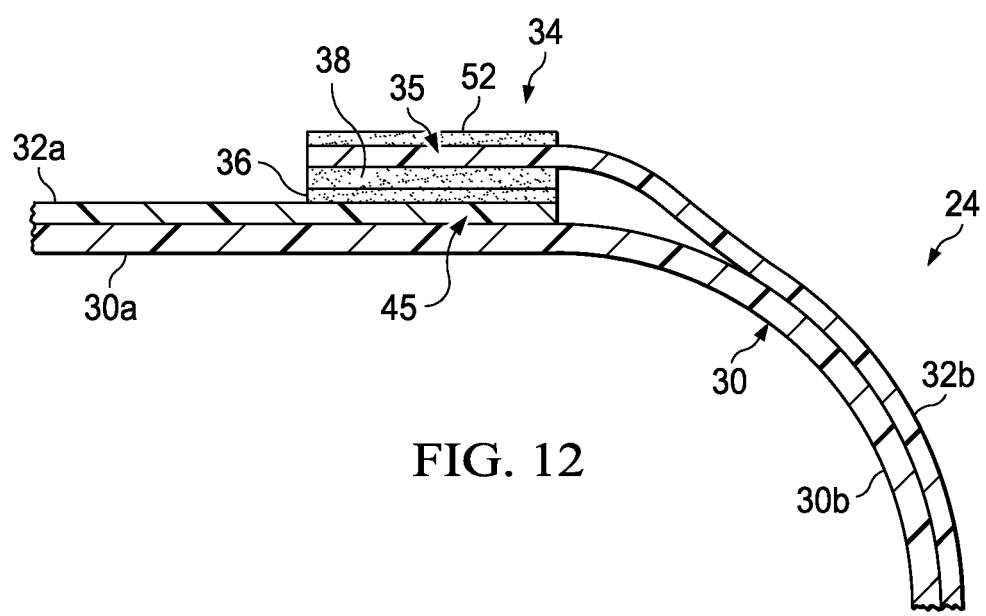

Next, as shown in FIG. 12, after the excess film 46 has been trimmed away, a strip of thin, adhesive tape 52, such as Mylar®, is then applied over the outer edges 35 of the dome section 32b to hold the dome section 32b in place. The process of installing a dome section of the barrier film 32 is repeated on the other end of the liner 30. With the entire liner 30 tightly wrapped with the barrier film 32, composite dome caps 42 (FIG. 5) of the structural outer wall are then be placed over the dome ends 30b of the liner 30, following which the constant cylinder section 44 of the structural outer wall 28 may be applied.

Figure 13:
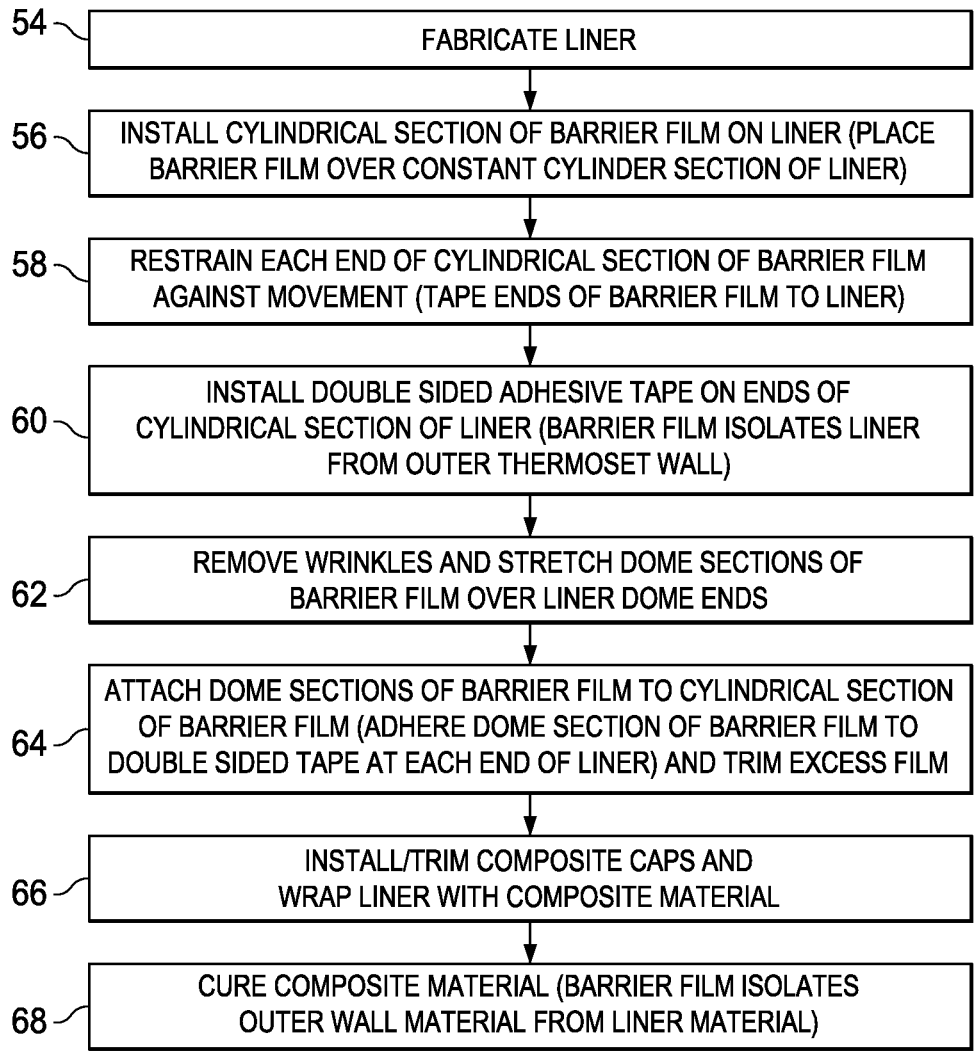
FIG. 13 is illustration of a flow diagram of a method of fabricating the pressure vessel.

FIG. 13 broadly illustrates and summarizes the steps of the method of fabricating a pressure vessel 20 having a dis-bond membrane 32, as described above. Beginning at 54, an inner liner 30 is fabricated and 56, a constant cylinder section 32a of a barrier film 32 is installed over the cylindrical section 30a of the liner 30. At 58, each end of the constant cylinder section 32a of the barrier film 32 is restrained against movement, as by adhesively taping the edges of the barrier film 32 to liner 30 using a strip of Mylar® adhesive tape. At step 60, double-sided tape 38 is installed on each end of the cylindrical section 30a of liner 30. The barrier film 32 isolates the liner 30 from the double-sided adhesive tape 38. At step 62, the dome sections 32b of the barrier film 32 are installed over the dome ends 30b by stretching the barrier film 32 down over the liner 30 to remove any wrinkles in the barrier film 32.

At step 64, the dome sections 32b of the barrier film 32 are attached to the constant cylinder sections 32a of the barrier film 32, by adhering the dome sections 32b to the double-sided tape 38 at each end of the liner 30. After the dome sections 32b have been attached, any excess barrier film 46 is trimmed away, and the edges of the dome section 32b are wrapped with a strip of Mylar® adhesive tape. At 66, composite dome caps 42 are installed on the outer ends 24, following which the cylindrical section 30a of the liner 30 can be wrapped with composite material to form the constant cylinder section 44 of the structural outer wall 28. At step 68, the composite dome caps 42 and the wrapped composite constant cylinder section 44 are thermally cured. During curing, the barrier film 32 prevents direct contact between the liner 30 and the outer wall 28, thereby preventing co-mingling of the thermoplastic liner 30 with reinforcing fibers in the structural outer wall 28.

Figure 14:
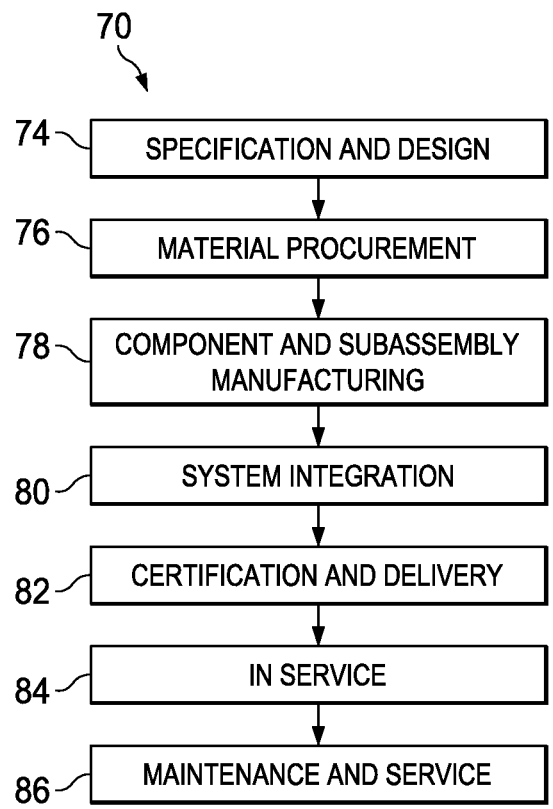
FIG. 14 is an illustration of a flow diagram of aircraft production and service methodology.
Figure 15:
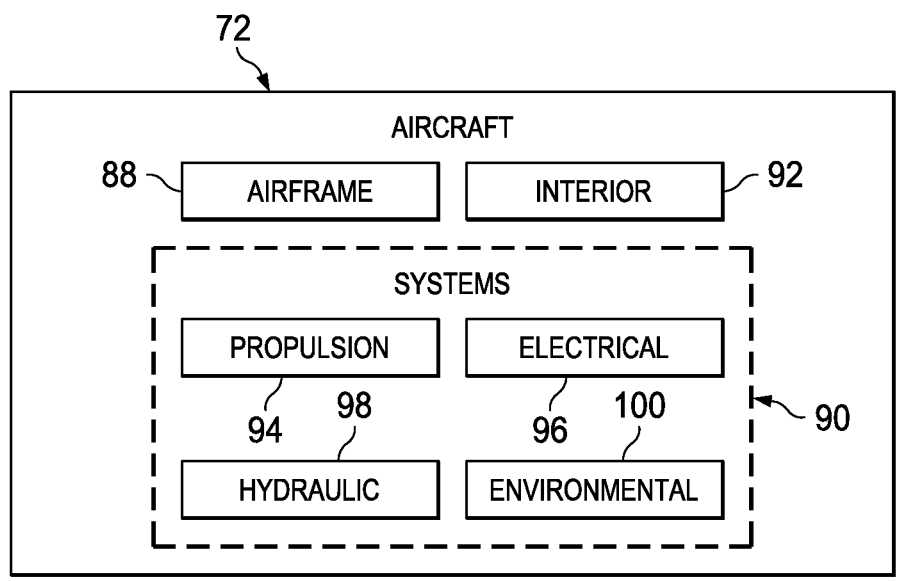
FIG. 15 is an illustration of a block diagram of an aircraft.

Embodiments of the disclosure may find use in a variety of potential applications, particularly in the transportation industry, including for example, aerospace, marine, automotive, truck and bus applications and other application where pressurized vessels may be used. For example, the disclosed pressure vessel may be employed to store a gas such as hydrogen used to power cars, trucks and buses. Thus, referring now to FIGS. 14 and 15, embodiments of the disclosure may be used in the context of an aircraft manufacturing and service method 70 as shown in FIG. 14 and an aircraft 72 as shown in FIG. 15. Aircraft applications of the disclosed embodiments may include, for example, without limitation, pressurized tanks used to store a gas. During pre-production, exemplary method 70 may include specification and design 74 of the aircraft 72 and material procurement 76. During production, component and subassembly manufacturing 126 and system integration 80 of the aircraft 72 takes place. Thereafter, the aircraft 72 may go through certification and delivery 82 in order to be placed in service 84. While in service by a customer, the aircraft 72 is scheduled for routine maintenance and service 86, which may also include modification, reconfiguration, refurbishment, and so on.

Each of the processes of method 70 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 15, the aircraft 72 produced by exemplary method 70 may include an airframe 88 with a plurality of systems 90 and an interior 92. Examples of high-level systems 90 include one or more of a propulsion system 94, an electrical system 96, a hydraulic system 98 and an environmental system 100. Any number of other systems may be included. The disclosed pressure vessel may be employed as part of any of the systems 94 pressurized storage of a gas or liquid is required. Although an aerospace example is shown, the principles of the disclosure may be applied to other industries, such as the marine and automotive industries. More particularly, for example, the disclosed pressure vessel may be used to store a fuel such as hydrogen onboard a hydrogen fueled vehicle.

Systems and methods embodied herein may be employed during any one or more of the stages of the production and service method 70. For example, components or subassemblies corresponding to production process 78 may be fabricated or manufactured in a manner similar to components or subassemblies produced while the aircraft 72 is in service. Also, one or more apparatus embodiments, method embodiments, or a combination thereof may be utilized during the production stages 78 and 80, for example, by substantially expediting assembly of or reducing the cost of an aircraft 72. Similarly, one or more of apparatus embodiments, method embodiments, or a combination thereof may be utilized while the aircraft 72 is in service, for example and without limitation, to maintenance and service 86.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. For use in fabricating a pressure vessel, a method of forming a dis-bond membrane between a structural outer wall and an inner liner having a cylindrical section and dome ends, comprising:
   installing a cylinder section of a barrier film around the cylindrical section of the liner, wherein the barrier film is a thermoplastic having a softening temperature greater than a cure temperature of the structural outer wall, and wherein the inner liner has a softening temperature that is less than a cure temperature of the structural outer wall; and
   installing dome sections of the barrier film over the domed ends of the liner, including stretching the dome sections of the barrier film to conform to the dome ends and overlap a portion of the cylinder section of the barrier film.

2. The method of claim 1, wherein installing the cylinder section of the barrier film includes attaching the cylinder section of the barrier film to the cylindrical section of the liner.

3. The method of claim 2, wherein attaching the cylinder section of the barrier film is performed using an adhesive tape.

4. The method of claim 1, wherein installing the dome sections of the barrier film includes:
   applying an adhesive along outer edges of the cylinder section of the barrier film, and
   adhering the dome sections of the barrier film to the adhesive.

5. The method of claim 4, wherein:
   applying the adhesive along the outer edges of the cylinder section of the barrier film is performed by applying an adhesive tape to the outer edges of the barrier film, and
   adhering the dome sections of the barrier film to the adhesive includes tacking outer edges of the dome sections of the barrier film to the adhesive tape.

6. The method of claim 4, wherein installing the dome sections of the barrier film includes removing a part of the outer edges of the cylinder section of the barrier film extending beyond the adhesive.

7. A method of fabricating a pressure vessel having a constant cylindrical body and dome-shaped outer ends, comprising:
   fabricating a thermoplastic liner having a cylindrical section and dome ends;
   installing a cylinder section of a barrier film on the thermoplastic liner;
   stretching dome sections of the barrier film respectively over the dome ends of the thermoplastic liner;
   attaching the dome sections of the barrier film to the cylinder section of the barrier film; and
   fabricating a composite structural outer wall over the thermoplastic liner, wherein:
   the thermoplastic liner has a softening temperature that is less than a cure temperature of the structural outer wall, and
   the barrier film is a thermoplastic having a softening temperature that is greater than the cure temperature of the structural outer wall.

8. The method of claim 7, wherein stretching the dome sections of the barrier film include drawing the dome sections of the barrier film into overlapping relationship to the cylinder section of the barrier film.

9. The method of claim 7, wherein attaching the dome sections of the barrier film to the cylinder section of the barrier film includes:
   applying double-sided adhesive tape on edges of the cylinder section of the barrier film, and
   adhering edges of the dome sections of the barrier film to the double-sided adhesive tape.

10. The method of claim 9, further comprising:
    trimming away an edge of the cylinder section of the barrier film extending beyond the double-sided adhesive tape.

11. The method of claim 9, wherein:
    attaching the dome sections of the barrier film to the cylinder section of the barrier film includes applying Mylar® film along outer edges of the cylinder section of the barrier film, and
    applying the double-sided adhesive tape is performed by applying the double-sided adhesive tape on the Mylar® film.

12. The method of claim 7, wherein:
    the structural outer wall includes a thermoset resin.

13. The method of claim 7, further comprising:
    curing the structural outer wall, and using the barrier film to prevent bonding of the thermoplastic liner and the structural outer wall.

14. The method of claim 7, wherein fabricating the structural outer wall includes:
    fabricating composite dome caps,
    installing the composite dome caps respectively on the dome ends of the thermoplastic liner, and
    wrapping composite material around the cylindrical section of the thermoplastic liner.

15. A dis-bond membrane between thermoplastic liner having cylindrical section and dome ends, and a fiber reinforced thermoset outer wall surrounding the liner, comprising:
- a barrier film between the outer wall and the liner, the barrier film including a cylinder section, and dome sections respectively attached to and overlapping opposite ends of the cylinder section, wherein each of the dome sections of the barrier film is stretched over the dome ends of the liner, wherein:
- the liner has a softening temperature that is less than a cure temperature of the thermoset, and
- the barrier film is a thermoplastic having a softening temperature greater than the cure temperature of the thermoset.

16. The dis-bond membrane of claim 15, wherein:
the liner is formed from polyethylene, and
the barrier film is formed from fluorinated ethylene propylene.

17. The dis-bond membrane of claim 15, wherein:
the softening temperature of the liner is approximately between 250° F. and 275° F., and
the cure temperature of the thermoset is approximately between 250° F. and 300° F.

18. The dis-bond membrane of claim 15, wherein:
the dome sections of the barrier film have edges adhesively attached to the cylinder section of the barrier film.

19. The dis-bond membrane of claim 15, wherein the barrier film is one of:
polyester, and
polyether ether ketone.

* * * * *